UNITED STATES PATENT OFFICE.

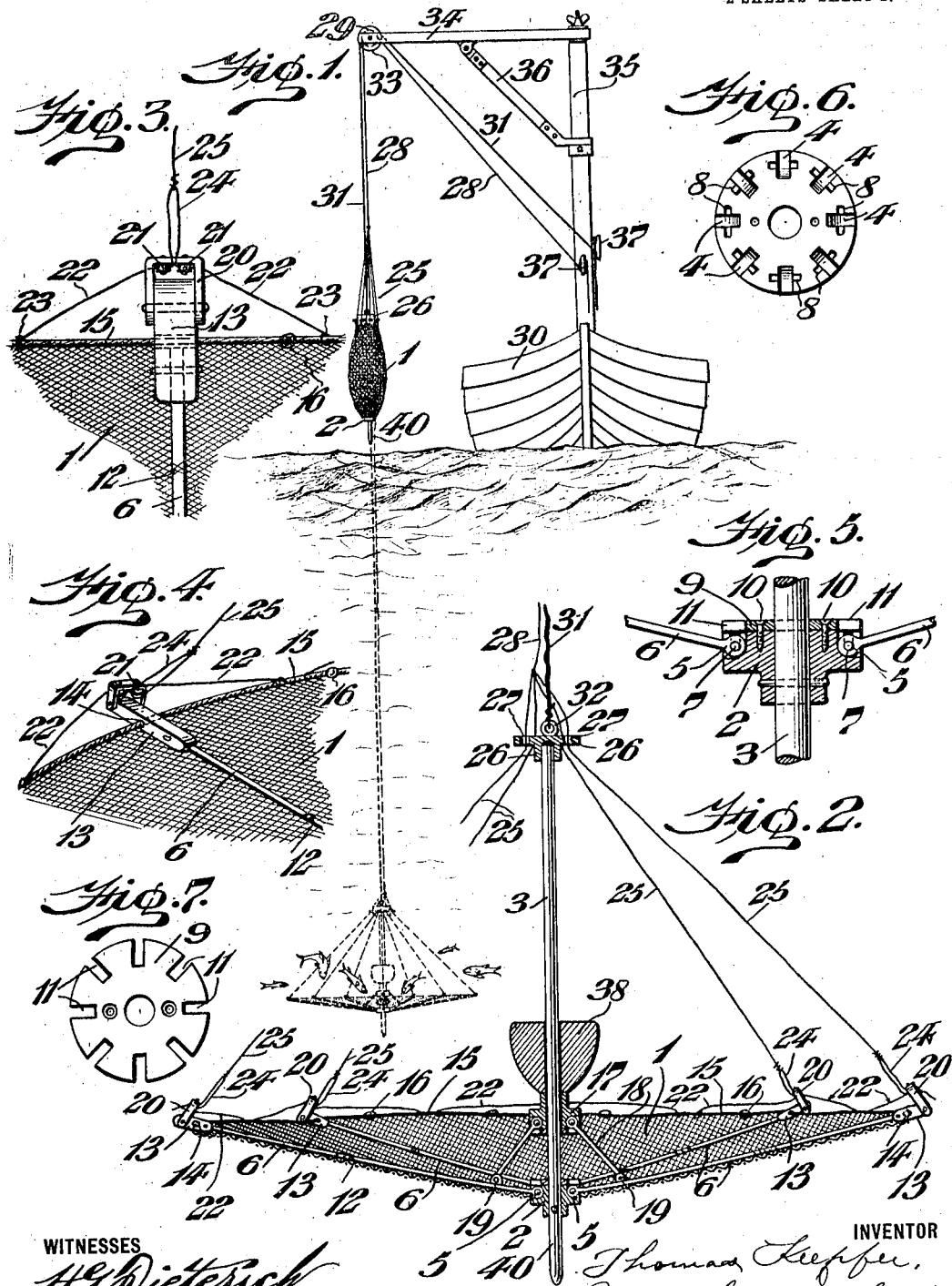

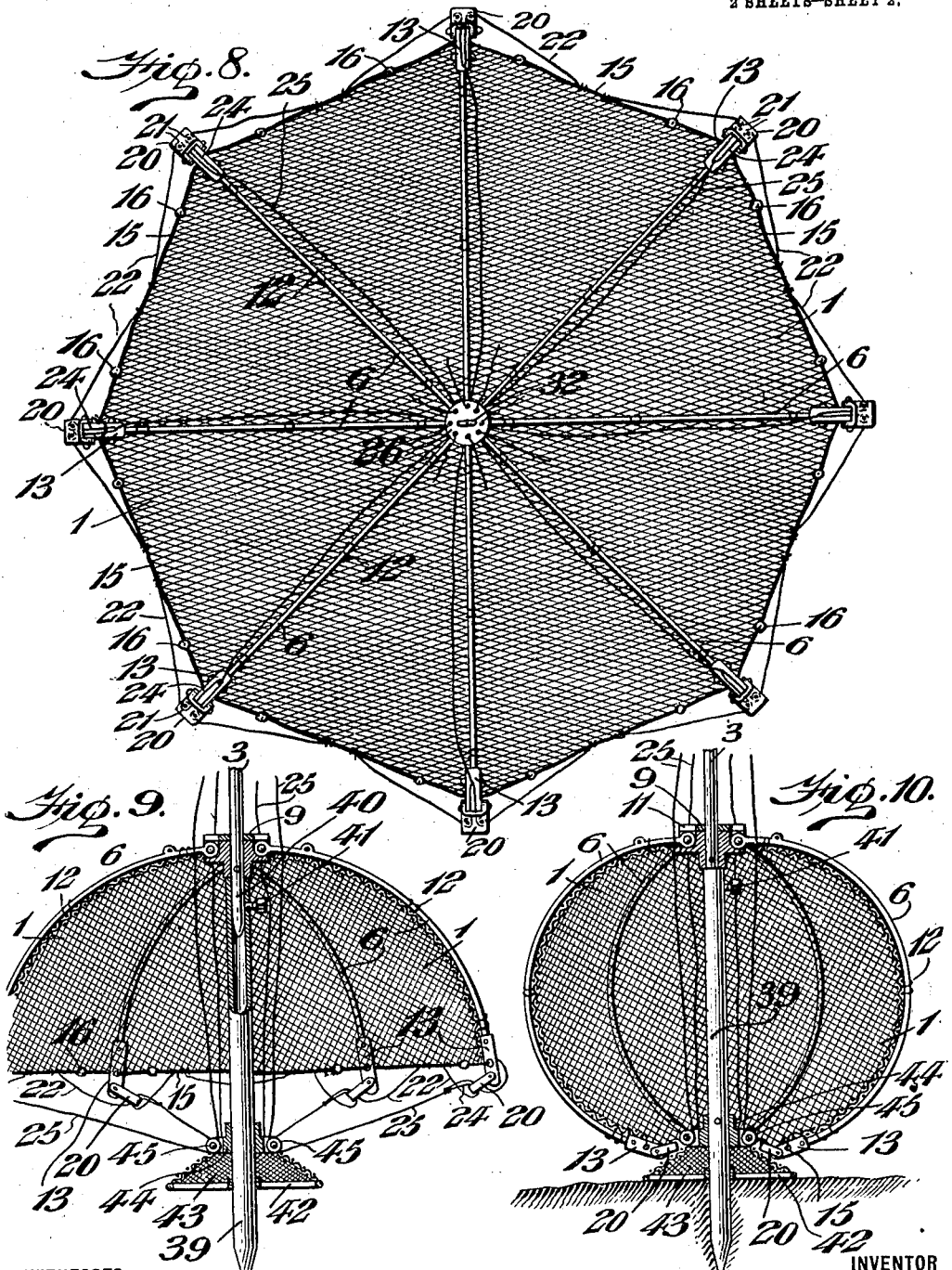

THOMAS KEEPFER, OF PHILADELPHIA, PENNSYLVANIA.

REVERSIBLE NET.

1,053,608.

Specification of Letters Patent. Patented Feb. 18, 1913.

Application filed August 19, 1912. Serial No. 715,703.

*To all whom it may concern:*

Be it known that I, THOMAS KEEPFER, a citizen of the United States, residing in the city and county of Philadelphia, State of Pennsylvania, have invented a new and useful Reversible Net, of which the following is a specification.

This invention relates to fish nets and more particularly to a reversible type of net which may be lowered from a boat or other supporting means into a body of water either in a closed or open condition, as desired, and used as either a dip or grab net according to the nature of the fish to be caught.

It has for an object to provide a net of the umbrella style which may be readily handled by a single operator, easily controlled, raised and lowered with a minimum amount of disturbance and which at the same time is so constructed and arranged as to insure the ready capture of any fish which enter the net when it is in the water.

It further consists of a fish net structure which may be lowered to the bottom of a body of water and after the fish have located themselves above its upper surface the device may be drawn up and retain the fish therein.

Furthermore the structure is adapted for use as a grab net to inclose fish or the like beneath the net and may be closed up to imprison a large number of fish when it is operated in this manner.

It further consists of other novel features of construction all as will be hereinafter fully set forth.

For the purpose of illustrating my invention, I have shown in the accompanying drawings a preferred embodiment which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents my novel fish net in operation showing the closed position of the net in full line, and the open or operative position of the same in dotted line. Fig. 2 represents a vertical section of the net structure and its adjuncts. Fig. 3 represents a detail in plan of one of the net parts. Fig. 4 represents a perspective of the same part shown in operative position. Fig. 5 represents a section showing the details of construction of one of the collars to which certain adjuncts of the net are secured. Figs. 6 and 7 represent, respectively, parts of the collar of Fig. 5. Fig. 8 represents a plan of the net in open position. Figs. 9 and 10 represent, respectively, vertical sections of the device in open and closed positions when used as a grab net.

Similar numerals of reference indicate corresponding parts in the figures.

Referring to the drawings: 1 designates the net or body portion of my novel device, the same being preferably shown as substantially octagonal in shape and having at the center thereof a collar 2, which is apertured to receive the main spindle or rod 3 by which the raising or lowering movements are controlled, and to which the said collar is fixedly secured in any desired manner. The collar 2, in the present instance, is provided with a plurality of radially disposed slots 4, within which are respectively mounted the eyelet ends 5 of the net ribs 6. These ribs 6 are preferably flexible and are each secured in place on the collar 2 for pivotal action by means of pins 7 which pass transversely of each slot 4 and are seated in suitable recesses 8, within which they are confined by means of the plate 9. This latter element is fixed to the collar 2 by means of screws 10 or like fastening devices, and is provided with a plurality of radially disposed slots 11, normally alined with the respective slots 4, thus permitting the ribs 6 to have a comparatively wide angle of movement and to assume a position in close proximity to the rod 3, this position of course being the closed position of the net, as indicated in Fig. 1.

The ribs 6 are preferably attached at suitable intervals to the net body 1 by splicing or the like, as indicated at 12, and each terminates in a head 13, which is preferably of sufficient size and substance to form an effective weight to maintain the net normally in open position as shown in Fig. 2. The heads 13 are each provided with an opening 14, through which passes a rope 15 forming a binding or edge around the outer circumference of the net 1, and it will further be noted that a plurality of weights 16 are secured to this rope at suitable intervals to maintain the net properly spread out.

17 designates a second collar, preferably similar in construction to the collar 2, but slidably mounted on the rod 3 and having means to pivotally secure the ends of a plurality of stay rods or links 18, the opposite ends of which are respectively pivoted at 19 to the several ribs 6. By this construction it will be seen that longitudinal movement of the collar 17 in one direction or the other, causes either an opening or closing of the net body.

20 designates a loop member preferably pivoted to each of the heads 13, and carrying, as here shown, a pair of guide pulleys 21 which serve as a rotatable bearing for the lifting cords 22. In my preferred construction I employ the same number of cords 22 as there are ribs 6, and the said cords are attached at their ends to the rope 15 at suitable points as indicated at 23, while the middle portion of each cord passes between the pulleys 21 to form a loop 24 for engagement with the control lines 25. The several lines 25 pass from the loops 20 to a guide disk 26, which is suitably fixed to the end of the rod 3 and in the present instance is provided with a plurality of apertures 27, corresponding in number to the lines 25. Each line 25 passes through one of these openings 27 after which they are all united to a common control rope 28 which leads in the present instance over a pulley 29 to the operating point as the boat 30.

31 designates a cable, for raising and lowering the net device, the same being secured at one end to an eye-bolt 32 of the rod 3, while its opposite end passes over a pulley 33 to the boat 30. As here shown the pulleys 29 and 33 are rotatably mounted on an arm 34 swingingly carried by a post 35 fixed in the boat in any desired manner. In order to reinforce the said arm 34 I preferably utilize a brace bar 36, between the said arm 34 and the post 35, the outer end of the same being pivotally mounted as will be apparent. 37 designates a pair of cleats to which the operating wire 28 and cable 31 may be temporarily fastened.

38 designates a weight preferably apertured to permit the passage of the rod 3 and upon which the said weight is located by resting on the collar 17. This construction insures the proper sinking of the net when lowered into the water and its maintenance in operative position.

In the operation of the net it is first baited by tying or otherwise securing the required bait to certain of the brace rods within the net after which it is swung over the correct place by moving the arm 34 about the post as a pivot. It is now lowered by paying out the rope 28 and cable 31. As soon as the net has reached the proper depth the cable 31 is made fast to one of the cleats as 37, and the cord 28 further released so that the net assumes the position shown in dotted lines in Fig. 1. The spreading of the net is materially aided by means of the weight 38 operating at the center of the net and the weights 16 around the circumference thereof. The fish are then attracted or lured into the net by means of the bait, and after a suitable period the net is hauled in by using the cable 31, though of course it will be understood that it is also necessary to reel in the net cord 28 simultaneously.

In Figs. 9 and 10 I disclose a modification for using the net as a grab type and for this purpose I employ a tubular member 39 adapted to fit over the projecting end 40 of the rod 3 and adapted to be secured thereto by means of a set screw 41 or similar fastening means. This tubular extension 39 carries a ring 42 preferably of sufficient weight to maintain the netted body portion 43 in extended or conical shape to form a closure for the net 1 when it is drawn into the position shown in Fig. 10. To the upper portion of the net closure 43 there is secured a ring 44, which is also fixed to the tubular member 39 and carries a plurality of radially disposed guide wheels or rolls 45 around which pass the respective cords 25 of the net proper, after they have been led through the meshes of the net, as shown in Fig. 9. In operating this embodiment of my invention, the net is lowered adjacent the bottom of the body of water and being baited on its underneath portion is ready for use. After a suitable length of time the operating cords 25 are drawn upwardly thus bringing the ends of the ribs 6 together as shown in Fig. 10, the opening at the center thereof being closed by the net member 43. The net may now be raised by operating the cable 31 and the imprisoned fish brought to the surface.

It will now be apparent that I have devised a fish net particularly adapted for the purpose intended, one which is simple in construction and easy of operation and one which is particularly effectual in entrapping and catching fish. The novel reversing feature produces a result not heretofore attained in nets of this character and is highly effective as a grab net for taking fish which feed on or close to the bottom of the water.

It will now be apparent that I have devised a novel and useful construction of a reversible net which embodies the features of advantage enumerated as desirable in the statement of the invention and the above description, and while I have, in the present instance, shown and described preferred embodiments thereof which have been found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. In a device of the character stated, a rod, a plurality of ribs pivotally carried by said rod and radially arranged with respect thereto, a net secured to said ribs, means to shift said ribs to open or close said net, a head carried by each rib and forming a weight for the outer end thereof, a line terminating adjacent the outer end of each rib, means to join said lines to said net at each side of each rib, a control rope to which all of said lines are connected, means to maintain said net in open position and a cable for operating said rod and its adjuncts.

2. In a device of the character stated, a rod, a plurality of ribs pivotally carried by said rod and radially arranged with respect thereto, a net secured to said ribs, means to shift said ribs to open or close said net, a head carried by each rib and forming a weight for the outer end thereof, a cord loop adjacent each head and having its ends attached to said net, a guide device therefor secured to each head, a line connected to each loop, a control rope to which all of said lines are attached, means to maintain said net in open position, and a cable for operating said rod and its adjuncts.

3. In a device of the character stated, a rod, a plurality of ribs pivotally carried by said rod and radially arranged with respect thereto, a net secured to said ribs, means to shift said ribs to open or close said net, a head carried by each rib and forming a weight for the outer end thereof, a cord loop adjacent each head and having its ends attached to said net, a member pivotally carried by each head, guide pulleys on each of said members between which said cord loops are respectively adapted to pass, a line connected to each cord loop, a control rope to which all of said lines are attached, means to maintain said net in open position, and a cable for operating said rod and its adjuncts.

4. In a device of the character stated, a rod, a plurality of ribs pivotally carried by said rod and radially arranged with respect thereto, a net secured to said ribs, means to shift said ribs to open or close said net, a head carried by each rib and forming a weight for the outer end thereof, a cord connected adjacent the outer end of each rib and forming a plurality of loop members, a guide disk fixed to said rod and having a plurality of openings therethrough, a line passing through each of said openings and connected to said repective loop members, a control rope to which all of said lines are connected, means to maintain said net in open position, and a cable secured to said guide disk to control the movement of said rod and its adjuncts.

THOMAS KEEPFER.

Witnesses:
E. HAYWARD FAIRBANKS,
M. E. BYRNE.